Nov. 30, 1943.

C. McINTOSH

Re. 22,396

SUPERHEATER

Original Filed Feb. 15, 1941 2 Sheets-Sheet 1

INVENTOR
CHARLES McINTOSH
BY
Newell & Spencer & Safford
ATTORNEYS

Nov. 30, 1943. C. McINTOSH Re. 22,396

SUPERHEATER

Original Filed Feb. 15, 1941 2 Sheets-Sheet 2

INVENTOR
CHARLES McINTOSH
BY
Newell & Spence & Daffard
ATTORNEYS

Reissued Nov. 30, 1943

Re. 22,396

UNITED STATES PATENT OFFICE 22,396

SUPERHEATER

Charles McIntosh, Detroit, Mich.

Original No. 2,309,706, dated February 2, 1943, Serial No. 379,029, February 15, 1941. Application for reissue September 30, 1943, Serial No. 504,484

5 Claims. (Cl. 122—479)

This invention relates to superheaters and particularly to superheaters of the type intended to be located in the combustion chamber of a vapor generator, such as a steam generator, and directly exposed to the radiant heat and to the hot products of the combustion taking place therein.

In all types of superheaters heretofore employed, whether directly exposed to both the radiant heat and the convection heat of the combustion chamber or arranged interdeck so as to be shielded from the radiant heat and to rely almost entirely upon convection for superheating, difficulty has been experienced in maintaining a substantially constant outlet temperature of the superheated steam or other vapor at varying boiler loads, especially when the range of variations is wide or the changes in demand sudden. In the prior art radiant type superheaters, which receive the greater part of their heat in the form of radiant energy from the fire, a sudden increase in steam demand causes a falling off of the outlet temperature and, vice versa, a lighter than average demand results in an increase in the outlet temperature. On the other hand the outlet temperature in the convection type superheater, located interdeck in the boiler, rises when the steam demand is heavy and falls off when the steam demand is light.

Attempts so to control the gas flow over the tubes of this last mentioned type of superheater, by manually controlled dampers and the like, as to adjust the heat input to the varying steam demands have not proved satisfactory because of the human element involved. Desuperheaters are also unsatisfactory, first, because they do not protect the structure from excessive heat and, secondly, because many of them give, as an end product, a non-homogeneous mixture of saturated and superheated steam.

In modern steam power plants in which high total temperatures of the steam and high pressures are employed, such, for example, as a steam temperature of 900° F. and a steam pressure of 2000 lbs. per square inch, it is important that marked variations in the steam temperature be not permitted, since the temperature is already above the red heat of the metal of the tubes and marked variations in the temperature might cause serious damage to the steam generating plant as well as damage to the prime movers, such as steam turbines.

A general object of the present invention, therefore, is to provide a superheater, and particularly a superheater of the type which receives its main heat in the form of radiant energy from the fire, in which not only can there be obtained a substantially constant outlet temperature of the superheated vapor, but in which the metal conduit through which the vapor travels and in which it receives its additional heat will be maintained at a temperature approximating that of the desired superheat temperature of the vapor, allowing, of course, for the heat drop through the metal to the vapor.

A particular object of the invention is to so control the temperature of the conduit or conduits through which the saturated vapor to be superheated passes, and in which it receives the additional heat, as to compensate for marked variations in the heat, both radiant and convection, to which the conduit is exposed. More particularly, the invention aims to effect such a controlled absorption of the heat, either radiant or convection, to which the superheating conduit is exposed, by means of a constantly flowing liquid as essentially to shield the vapor to be superheated from excessive heating or, in other words, to maintain, by absorption of excessive heat before it reaches the vapor to be superheated, a predetermined temperature relation between the superheating conduit and the vapor passing therethrough.

Having regard to the foregoing objects, the invention contemplates so constructing and arranging a central liquid conduit, which is surrounded by a plurality of parallel vapor conduits each having a wall thereof in continuous metallic heat-exchanging relation to the liquid in the central liquid conduit, that the walls of the liquid conduit, which will be wetted to the required extent by a positive but controllable flow of liquid therethrough, extend between the vapor conduits, in integral heat-conducting relation thereto, to points where they provide highly conductive, short-circuiting by-passes to the liquid for heat received by the structure in excess of that required to maintain the vapor conduit walls at the proper temperature for the desired outlet vapor temperature.

The invention further contemplates so adjusting the flow of the liquid in respect to the temperature of the vapor as it is discharged from the superheating conduits as to maintain a substantially constant superheat temperature. When the boiler with which the superheater is associated is in continuous operation, such control of the liquid in the central liquid conduit by the temperature of the superheated vapor will comprise, for the most part, varying the liquid flow for the purpose of maintaining the desired constant outlet temperature with varying rates of steam demand or boiler load and with the usual incidental varying heat releases in the combustion chamber. However, when starting up a boiler having a superheater embodying the present invention associated therewith, there will be no vapor flowing through the vapor conduits immediately and therefore the outlet temperature in the thermometer well of the vapor manifold will be substantially at the liquid shut-off point, with the result that, unless some provision be made for control other than by the outlet temperature of the vapor, both the vapor and liquid conduits would soon be dry. The invention, therefore, contemplates such auxiliary control of the liquid flow as to insure protective flow of liquid through the liquid conduit when there is no vapor flow to protect the vapor conduits.

In particular, the invention contemplates the provision of three separate, but at times cooperative, means for controlling the flow of the temperature governing liquid through the liquid conduit, one of these means being governed in its operation by the outlet temperature of the superheated vapor, another of these means being governed in its operation by the outlet temperature of the liquid or mixture of liquid and vapor issuing from the liquid conduit and the third means being manually operated and used for the most part only when starting up a boiler with which the superheater is associated.

An important feature of the invention is the construction and arrangement of a central liquid conduit of such outside dimensions as to provide for the desired number and spacing of vapor conduits about it while at the same time providing a cross-sectional area of the liquid flow passage therein such as to insure the desired rate of flow and wetting effect without too much pump capacity. Other important features are the novel manifold construction, the novel arrangement of the control of the liquid flow between the circulating pump and the liquid conduit and the simple and convenient means for connecting the superheater to the various parts of the boiler associated therewith whereby it may readily be removed for cleaning, repair or replacement.

Other objects and important features of the invention will appear from the following description and claims when considered in connection with the accompanying drawings in which Figure 1 is a view showing a superheater embodying the present invention installed in a boiler of the "low head" type;

Figure 3:
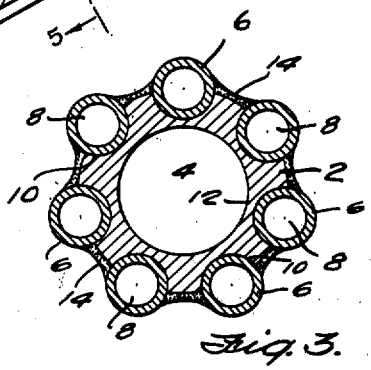
Figure 3 is a section on the line 3—3 of Figure 2.

In the illustrative embodiment of the invention, designed particularly for superheating steam, the water and steam conduits of the superheater, which are shown in section in Figure 3, comprise a tube 2 having therein the water passage 4, this tube 2 being of a diameter and of a wall thickness sufficient to provide for the accommodation about the periphery thereof of a substantial number of steam tubes 6 having therein the steam passages 8. Illustrative dimensions for the tube 2 are an internal diameter of 2⅛ inches with an original wall thickness of about ½ inch. As shown, this tube 2 has milled in its outer surface seven recesses 10 conformed to and arranged to receive the steam tubes 6 which may be, for illustration, of an outside diameter of 1⅛ inches and an inside diameter of ¾ inch. With the dimensions given, recesses 10 for seven steam tubes 6 can conveniently be provided in the outer surface of the tube 2 without reducing the wall thickness at the point 12 too much. With the dimensions given and the recesses formed as shown in Figure 3, the thickness of the wall at the point 12 will be in the neighborhood of ⅛ inch, which is sufficient to sustain ordinary boiler pressures. For higher pressures greater wall thicknesses may be provided.

The recesses 10 having been milled in the periphery of the tube 2 to fit, as closely as possible, the outer surfaces of the tubes 6, the tubes 6 are then welded in their positions on the tube 2 by welds 14 which form integral connections between each of the tubes 6 and the portions of the tube 2 lying between the recesses 10.

It will be seen that the welds 14, forming integral connections between the tubes 6 and the tube 2, provide highly conductive short-circuiting paths directly to the water in the conduit 4 for either radiant or convection heat impinging upon the tubes 6 and the welds 14. The effect of the provision of these by-passes for the heat will be more fully set forth hereinafter.

Figure 2:
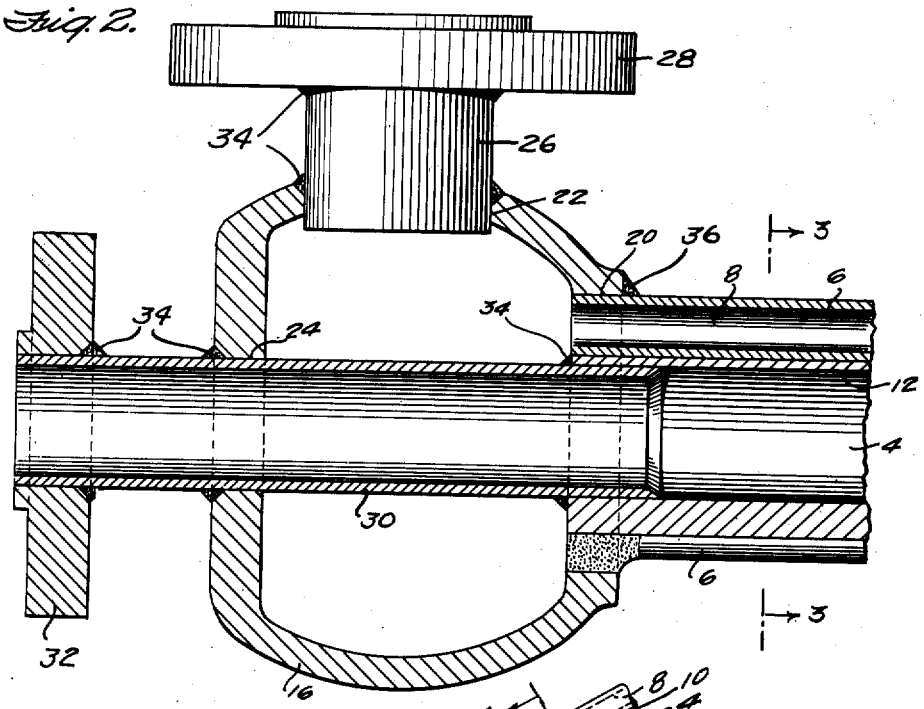
Figure 2 is a longitudinal section through one of the two manifolds connected to the ends of a superheater unit.

The assemblage of tubes just described is provided at each end with a manifold such as is illustrated in section in Figure 2 of the drawings. The illustrative manifold comprises a casting 16 having therein a steam chamber 18 which communicates with each of the passages 8 in the tubes 6. The casting 16 is provided with openings 20, 22 and 24, the opening 20 being adapted to receive the end of the assemblage of superheater and liquid tubes, the opening 22 being adapted to receive a nipple 26 provided with a connecting flange 28 in the form of a collar welded thereto for connecting the steam chamber 18 with a source of steam supply and the opening 24, concentric with the water passage 4 in the tube 2, being adapted to receive a short tube section or nipple 30 extending through the steam chamber 18 into the passage 4 of the tube 2 into close fitting relation thereto, this tube section or nipple 30 being also provided with a connecting flange 32 in the form of a collar welded thereto. Welds 34 secure the nipples 26 and 30 in their respective openings 22 and 24 and also secure the collars or flanges 28 and 32 respectively to the nipples 26 and 30. Welds 34 also secure the nipple 30 in its position in the tube 2. It will be understood that the collars 28 and 32 might be rotatably and slidably mounted on the nipples 26 and 30 and confined thereon by expanded nipple ends in a well-known manner.

In order to fit the tube assembly to the opening 20 in the casting 16, the welds 14 at the end of the assembly are increased in thickness until they completely fill the spaces between the tubes and until the end has an approximately circular outline which is then machined or ground to fit the circular opening 20. After this tube assembly is inserted in the opening 20, the header casting 16 is secured to the assembly by welds 36.

Figure 1:
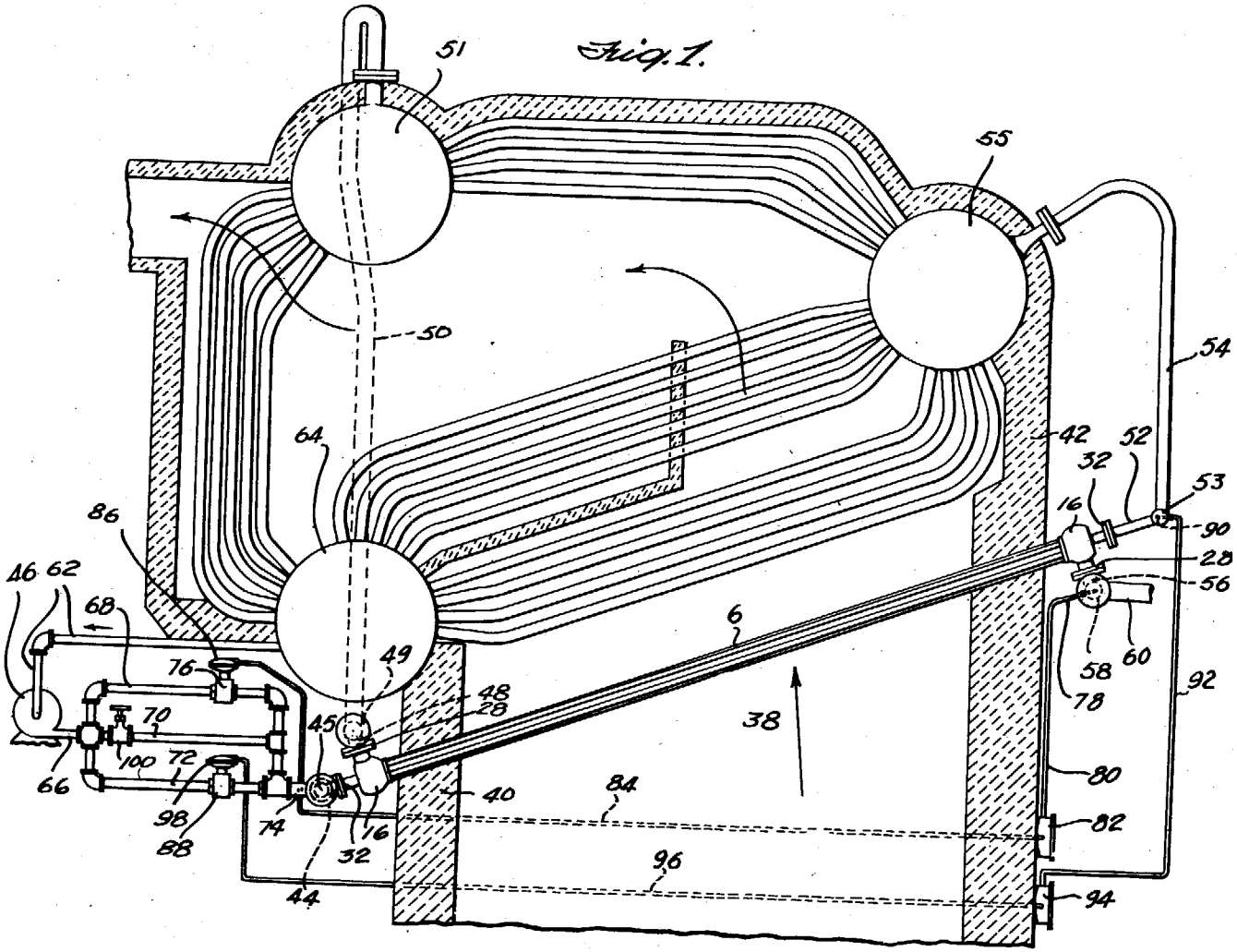

The superheater unit, constructed in the manner just described, may be inserted in the combustion chamber 38 of a boiler, for example one of the low head type, such as shown in Figure 1, in any suitable position to expose it to the heat released in said chamber, particularly the radiant heat, it being understood, of course, that a number of these units sufficient to effect the superheating of the maximum boiler output may be arranged side by side in the combustion chamber.

As shown in Figure 1, the superheater unit is inclined to the horizontal and the flow of both the steam and the water is preferably upward through the unit although it will be understood that, if desired to meet certain conditions, the steam and water might pass through the unit in counterflow relation to each other. As further shown in Figure 1, the superheater unit extends through both furnace walls 40 and 42 and the headers are located outside the combustion chamber. At its lower end the header of each superheater unit has its flange 32 connected to a corresponding flange on a nipple 44 branching off from a water manifold 45 connected to the pump 46 while the flange 28 is connected to a corresponding flange on a nipple 48 branching off from a steam manifold 49 connected by pipe 50 to the steam space in the drum 51. The header at the other end of each superheater unit has the flange 32 connected to a corresponding flange on a nipple 52 branching from a water manifold 53 connected by pipe 54 to the steam and water separating space in a drum 55 and has the flange 28 connected to a corresponding flange on a nipple 56 branching from a steam manifold 58. The steam manifold 58 is connected to the pipe 60 for delivering the superheated steam to the point of use.

If the flanges 28 and 32 are welded to their nipples 26 and 30 as shown in Figure 2, then, preferably, the cooperating flanges on the nipples 44, 48, 52 and 56 will be loosely mounted on said nipples to facilitate making the connections.

The intake 62 for the pump 46 is connected to the water drum 64 of the boiler and the discharge 66 of the pump 46 is connected through three branches 68, 70 and 72 with a common junction pipe 74 which, in turn, is connected to the water header 45.

In the branch pipe 68, between the discharge 66 and the junction pipe 74, is a valve 76 adapted to be controlled thermostatically through connections to a thermostatic element 78 in the thermometer well at one end of the manifold 58. These operating connections may be of any suitable or well known type, such as a connection 80 to a pneumatic relay 82 connected by an air tube 84 to the diaphragm valve operating mechanism 86.

In the branch 72, between the outlet 66 and the junction pipe 74, is another thermostatically controlled valve 88 arranged to be controlled by suitable connections to a thermostatic element 90 in the water outlet manifold 53, said connections comprising a lead 92 to a pneumatic relay 94 and an air tube connection 96 to a diaphragm valve operating mechanism 98.

In the branch 70, between the discharge 66 and the junction pipe 74, is a hand operated valve 100 designed principally for use when the boiler, with which the superheater is associated, is being started up.

From the foregoing description it will be seen that when a boiler is operating under load conditions, that is, when steam is being constantly delivered for use through the steam line 60, there will be a constant flow of steam through the passages 8 in the superheating tubes 6. It will further be seen that the amount of the superheat imparted to this steam will be controlled by the water flowing through the passage 4 in the central tube 6 and that the rate of flow of the water will be governed by the amount of cooling action required to maintain the tubes 6 at the proper superheating temperature, this flow necessarily varying somewhat with the variations in the boiler load or, in other words, with variations in the demand made upon the boiler.

If, for example, there be a sudden increase in steam demand, so that the rate of flow of the steam through the tubes 6 is so fast that, even with the increase in heat release in the combustion chamber usually accompanying such increased demand, there is not sufficient time for the saturated steam to receive the required superheat at the heat exchange rate provided by the then cooling action of the water flowing through the tube 2, any drop in steam temperature thus caused will act upon the thermostatic element 78 in the thermometer well in manifold 58 and cause the valve 76 to move toward its closed position, thus cutting down the rate of flow of the water through the central tube 2 and thereby reducing the amount of short-circuiting or by-passing of the heat impinging upon the tubes 6 and upon the welds 14 connecting these tubes integrally with the central tube 2. Vice versa, with the falling off of the demand for steam and the thus retarded movement of the steam through the tubes 6, with a corresponding greater opportunity to receive superheat, the tendency of the steam to emerge from the tubes 6 at a higher temperature will serve, through the thermostatic element 78 and its connection to the valve 76, to open the valve 76 and permit a greater flow of water through the central tube 2 and thus a greater cooling action upon the tubes 6 or, more technically speaking, a greater by-passing to the central tube 2 of the heat impinging upon the tubes 6 and upon the welds 14 which connect the tubes 6 with the tube 2.

Ordinarily during the operation of the boiler the control of the flow of the water through the central tube 2 by variations in the temperature of the superheated steam, as it is recorded by the thermostatic element 78, is sufficient both to secure the desired constant superheat and to insure protection of the structure from overheating. When starting up the boiler, however, and under exceptional conditions, further control of the flow of water through the central tube 2 by means of the outlet temperature of the water, or of the mixture of steam and water, as it is received in the manifold 53 is desirable to prevent injury to the metallic structure and for this reason the thermostatic element 90, with its connections to the valve 88, is provided.

It will be apparent that when starting to heat up a cold boiler there will be no steam pressure, no steam flow through the steam line 60 and therefore no flow through the superheater tubes 6. Moreover, it will be evident that any condensed steam that may still be in the superheater tubes 6 will quickly be vaporized and thus soon leave these tubes substantially dry. In the central tube 2 there will ordinarily be some water left from the previous operation of the boiler but, in the absence of water supplied from the manifold 45 under the action of the pump 46, this water in the central tube 2 will quickly be vaporized and pass over as steam through the pipe 54 into the drum 55. Also, because of the cold condition of the structure at starting, the thermostatic elements 78 and 90 will operate to maintain the valves 76 and 88 in their closed condition, thus preventing pump circulation of water through the central tube 2 at the time of starting unless the hand valve 100 be opened.

Having regard to the foregoing conditions surrounding the structure at the time of starting up the boiler, a convenient way of insuring the protection of the structure from excessive heat is to open the manually operated valve 100 slightly so that the pump 46 will effect a slight circulation of water through the central tube 2 sufficient to keep it protected either by an actual wetting of the surfaces of the tube by the water or by the flow therethrough of steam into which the restricted stream of water will quickly be converted. In the latter case, if the flow of water is so slight not only that it is quickly converted into steam but that, before it is discharged into the manifold 53, this steam has reached a temperature above that for which the thermostatic element 90 has been set, then the thermostatic element 90 will operate to open the valve 88 and increase the flow of water through the central tube 2. The temperature above which the thermostatic element 90 will operate to open the valve 88 will ordinarily be so selected that, in the normal operation of the superheater, the thermostatic element 90 will not tend to increase the flow of water through the central tube 2 by opening the valve 88 unless there is a tendency to excessive generation of steam in the central tube 2 with a consequent danger of injury to the discharge end of the superheater structure by reason of excessive heating of the structure arising from the lack of a properly wetted surface in the conduit 4 at this end.

In order that the central tube 2 may accommodate on its periphery a substantial number of superheater tubes 6, it is essential that it be of substantial diameter. Even with a wall of substantial thickness this will usually leave a water passage 4 in said tube of considerable diameter. The greater the diameter of the passage 4 the lower will be the velocity of flow of the water forced through the passage 4 by a pump 46 of a given capacity.

Figure 4:
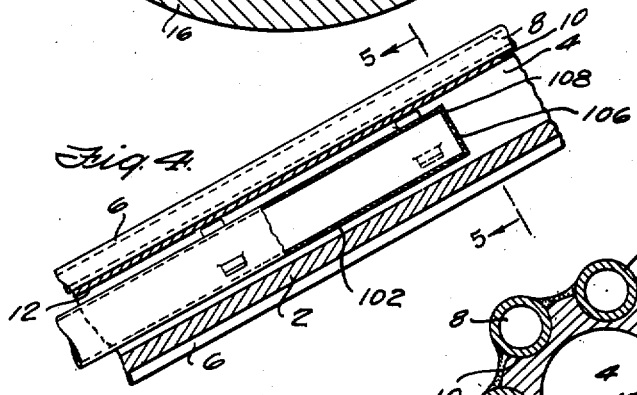
Figure 4 is a longitudinal sectional detail showing a modified construction of the liquid conduit.
Figure 5:
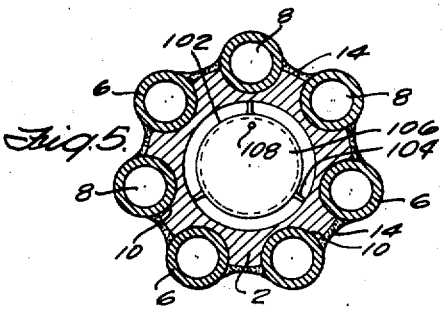
Figure 5 is a section on the line 5—5 of Figure 4.

In order to secure the desired velocity of flow in the tube 2 without requiring a pump 46 of too great capacity, the modified form of water conduit shown in Figures 4 and 5 may be utilized. In this conduit the passage in which the water flows is of annular cross section. To provide a water passage of such annular cross section, there is placed in the main passage 4 a tube 102 of somewhat smaller diameter than the passage 14, the tube 102 being held in concentric position in the passage 4 by spacers 104 welded thereto. As herein shown, three spacers are attached to the outer surface of the tube 2 at equiangular distances about the periphery of the tube 2, there being several of these groups of three spacers at intervals along the length of the tube 102. The dimensions of the spacers 104 are such that the tube 102 may readily be inserted in or removed from the tube 2.

To prevent substantial flow of the water through the tube 102 it is provided at one end, preferably the upper end of the tube 102 in an inclined superheater, with a closure 106 having an air vent 108 therein to permit ready drainage. It will thus be seen that the stream of water permitted to flow through the passage 4 in the tube 2 when the tube 102 is in position therein will have a cross sectional area equivalent to the difference between the cross sectional area of the passage 4 and the area of a circle having the outer diameter of the tube 102.

The pump 46 employed to produce the positive circulation through the water tubes 2 is preferably of the centrifugal type in order to avoid the necessity for providing a by-pass when the circulation is substantially completely shut off by the valves 76, 88 and 100. The pump, however, is preferably of such capacity that, when the maximum demand is made upon it, it will provide a substantial pressure head upon the water tubes 2 connected with the manifold 45, for example, a head of 30 lbs., thereby insuring a positive and effective circulation of water through the water passages 4 in the tubes 2.

As hereinabove suggested, when starting up the boiler from its cold condition, the hand-operated valve 100 is preferably opened slightly to provide a protective flow of water through the tubes 2 when the tubes 6 have no steam flowing therethrough. When the boiler has been heated up and is cut in to the steam line on which demand is being made, steam will flow through the superheater tubes 6. Even before this takes place, the hand-operated valve 100 may usually be closed, since the thermostat 90 in the manifold 53 will ordinarily have operated to insure circulation of water through the tubes 2 sufficient to protect the structure.

As soon as steam is flowing through the superheating tubes 6, the heat by-passed to the water in the tubes 2 will be reduced, with the result that the thermostat 90 in the manifold 53 will operate to close the auxiliary valve 88, thus leaving the control of the flow of the water through the tubes 2 to the thermostat 78 in the manifold 53.

When operating under varying demand, if the amount of steam flowing through the tubes 6 increases, thus tending to cool down the walls of the tubes, the slightly lower temperature of the superheated steam will cause the thermostatically operated valve 76 to close slightly, thereby reducing the flow of the water through the tubes 2. The resulting raised temperature of the tubes 6 will quickly bring the temperature of the superheated steam to the predetermined point. If, on the other hand, the amount of steam flowing through the tubes 6 is decreased, the metal of the tubes 6 will rise in temperature with a resulting increase in the superheat temperature and the thermostatically controlled valves 76 will then open more, increasing the flow of water through the tubes 2 and thereby cooling the tubes 6 and bringing the superheat temperature back to normal. If the steam be shut off entirely or reduced to a very small flow, the temperature of the water flowing through the tubes 2 will rise and thus actuate the thermostatically controlled valve 88 and increase the flow of water through the tubes 2 to compensate for the lack of cooling effected by the steam.

Although, in the illustrative embodiment of the invention the water for controlling the superheat temperature by flow through the tubes 2 has been shown as taken from the water drum of the boiler, and this is one of the most convenient and satisfactory arrangements, it will be understood that water from other sources may also be utilized for superheat temperature control purposes.

This application is a continuation in part of my application Serial No. 297,577, filed October 2, 1939, for Letters Patent for improvements in Superheaters.

What is claimed as new is:

1. Apparatus for raising saturated vapor flowing therethrough to a subsbtantially constant superheat temperature comprising, in combination, a central conduit for liquid, a plurality of parallel vapor conduits arranged about said liquid conduit and each having the wall thereof integrally connected to a part of the wall of said central conduit in such manner as to provide a highly conductive by-pass to the liquid in said conduit for heat impinging upon the structure in excess of that required for superheating, and means, governed in its effective operation by the outlet temperature of the superheated vapor, for producing a positive and continuous flow through said liquid conduit of a wall-wetting stream of liquid of a volume and velocity adequate only to absorb said excess heat of the structure, said liquid and said vapor passing through said structure in parallel flow and said structure providing no immediate integral heat-conducting path between the vapor in said conduits and the heat-absorbing liquid.

2. Apparatus according to claim 1 in which the main stream portion of said liquid conduit is of sufficient circumference to cooperate with at least five surrounding vapor conduits and is of annular cross section in order to provide rapid flow of the heat-absorbing liquid in said liquid conduit.

3. Apparatus according to claim 1 in which a tube concentrically positioned in said liquid conduit and provided with means for resisting flow through its passage defines a conduit of annular cross section for the main liquid flow, said conduit being of sufficient circumference to cooperate with at least five surrounding vapor conduits and the reduction in the stream cross-section effected by the concentric tube serving to accelerate the rate of flow of the heat-absorbing liquid while still maintaining it in immediate heat-exchanging relation to those parts of the structure which serve to divert excess heat from the vapor conduits.

4. Apparatus according to claim 1 in which additional thermostatic controlling means are provided whereby the effective operation of the liquid flow-producing means is governed also by the outlet temperature of the liquid.

5. Apparatus according to claim 1 in which intake and discharge manifolds supply a plurality of superheaters of the described construction and in which additional thermostatic controlling means are provided whereby the input into the liquid intake manifold is controlled also by the mean temperature of the liquid in the liquid discharge manifold.

CHARLES McINTOSH.